United States Patent [19]

Lagares-Corominas

[11] Patent Number: 5,785,589
[45] Date of Patent: Jul. 28, 1998

[54] METHOD FOR TREATMENT OF MEAT PIECES BY HAMMER AND A MACHINE FOR ITS EXECUTION

[75] Inventor: Narcís Lagares-Corominas, Girona, Spain

[73] Assignee: Metalquimia, S.A., Girona, Spain

[21] Appl. No.: 648,591

[22] Filed: May 16, 1996

[30] Foreign Application Priority Data

May 16, 1995 [ES] Spain .................................. 9500934

[51] Int. Cl.$^6$ .................................................. A22C 9/00
[52] U.S. Cl. ........................................................ 452/141
[58] Field of Search ................................... 452/144, 141

[56] References Cited

U.S. PATENT DOCUMENTS

| | | | |
|---|---|---|---|
| 747,519 | 12/1903 | Weathers | 452/144 |
| 3,413,681 | 12/1968 | Manaster | 452/141 |
| 3,744,089 | 7/1973 | Fetzer et al. | |
| 4,343,067 | 8/1982 | Shelton | |
| 4,348,787 | 9/1982 | Wolff | |
| 5,035,672 | 7/1991 | Rocha et al. | 452/141 |

FOREIGN PATENT DOCUMENTS

| | | |
|---|---|---|
| 2146291 | 3/1973 | France |
| 8800786 | 10/1989 | Netherlands |
| 8102457 | 4/1981 | Spain |
| 8600988 | 2/1986 | Spain |
| 8705198 | 7/1987 | Spain |

*Primary Examiner*—Willis Little
*Attorney, Agent, or Firm*—Jacobson, Price, Holman & Stern, PLLC

[57] ABSTRACT

A method and a machine for the treatment of meat pieces by hammering. The method consists in submitting the meat pieces during stopping stages in their progress along a deck (3) to one or more blows dealt by a succession of hammering members (12) whose surface provided to contact the meat piece has a plurality of pointed protrusions (15). The machine comprises a conveyor (1) providing a unitary feeding of meat pieces towards a stationary deck (3) with a plurality of pointed protrusions (4) distributed along its surface and the deck (3) having associated means providing a back-and-forth intermittent motion of the meat pieces. Above said deck (3) a plurality of independent hammering members (12) associated to respective individual actuators is arranged operable to move downwards the respective one of said members (12) till hitting a meat piece at a stage at which the latter has stopped in its travel on said deck (3) and to return the corresponding hammering member (12) to an inactive position above said deck (3).

14 Claims, 4 Drawing Sheets

METHOD FOR TREATMENT OF MEAT PIECES BY HAMMER AND A MACHINE FOR ITS EXECUTION

FIELD OF THE INVENTION

The present invention concerns a method for the treatment of meat pieces, and in particular of boned or unboned meat pieces such as ham or shoulder meat and in general injected or boiled butchery products, or before their being injected (although it is as will be seen applicable to uncured meats), based on submitting said pieces to hammering cycles which can be repeated several times and are of controlled strength, and it also concerns a machine for its execution. The treatment as per the invention has been conceived to facilitate thereby shortening the working times ulterior operations for the processing of the meat pieces at other stages, such as in particular the prematuring, macerating, maturing and boning operations.

The method and machine as per the invention are applicable to:

- injected meat pieces at a stage before their maceration for example by massaging inside rotary drums such as those described in patents ES-A-81024457 (Gines Planas) and ES-A-8705198 (Metalquimia) or in similar units;
- unijected meat pieces at a stage before their being injected and macerated as indicated above;
- unboned products at a stage before their being injected and ulteriorly macerated and/or matured;
- meat pieces after slaughter and at the stiff stage known as of "rigor mortis", as an alternative and/or previously to their being prematured before an ulterior processing;
- unboned products before proceeding to their manual boning.

PRIOR ART

Once having been injected with brine meat pieces are currently being transferred to a massaging container for example of the rotary type and with blades causing their dragging and ulterior falling and knocking in the case of the boned products, or to static containers (seasoning in brine) in case of unboned products that cannot be roughly massaged since this would damage the morphology of the piece, in both cases with no intermediary operation whatsoever.

Also known in the prior art are machines for tendering previously injected and boned meat pieces such as those described in patents ES-A-8600988, U.S. Pat. No. 4,348,787 and WO-A-9418842, which instead of said macerating rotary containers comprise rotary and in some cases resiliently loaded rollers with protrusions or teeth distributed on their surface, the meat pieces being caused to advance between said rollers whose action determines an energetic massaging of the products. These machines are of problematic control and not very versatile to adapt to different types of meat pieces to be treated.

Also as a prior art it can be mentioned following patents: U.S. Pat. No. 5,035,672, NL-A-8.800.786, FR-A-2.146.291, U.S. Pat. No. 4,348,787, USD-A-4.343.067 and U.S. Pat. No. 3,744,089.

BRIEF DESCRIPTION OF THE INVENTION

The concept of the present invention consists in providing that said meat pieces to be processed pass before being treated in one of the above mentioned machines of the prior art or before the manual boning operation through a premassaging operation carried out by hammering the meat with hammering members with a plurality of pointed protrusions in order to obtain accelerated stretchings of the muscular fibers which increase the intramuscular spaces thereby facilitating the quick absorption of the injected ingredients and additives and thus accelerating the whole process of maturation and solubilization of the myofibrillar proteins. In the case of unboned products the tendering of the product and the stretching and separation of the fibers allow the product to hold more liquid when being ulteriorly injected thus favoring the ulterior maceration and increasing the postboiling performance. Furthermore, since the intermuscular connections can be weakened as a consequence of said hammering the method and the machine for its implementation can equally be used for tendering unboned meat pieces coming out of the slaughterhouse thereby facilitating their manual boning afterwards. As has been intimated, said hammering does also produce a tendering that is apt to shorten the prematuring stage that is necessary for the meat processing, this being because of the slackening, produced by said hammering, of the muscular stiffness known as "rigor mortis". It is manifest that in all cases a shortening of the ulterior processing times is obtained as regards the further processing of the meat products at the prematuring, the massaging and/or the maturing or the boning stages, an increase of the performances (more liquid retention) being also obtained in some cases.

The method as per the invention is characterized in that it comprises the following stages:

- feeding the previously injected or not injected meat pieces on a longitudinal deck;
- intermittently moving the meat pieces along said longitudinal deck;
- during the stopping stages in their progress along said deck, submitting the meat pieces to one or more blows dealt by a succession of hammering members acting by way of hammers whose surface provided to contact the meat piece does advantageously have a plurality of pointed protrusions;
- adjusting the strength with which each hammering member or hammer is to actuate, and selecting the number of hammers intervening during the treatment and the number of blows to be dealt by each of said hammers depending on the characteristics of the meat piece to be treated;

thereby bringing about a tendering of said products and an accelerated stretching of their muscular fibers and a weakening of the intermuscular connections, as has been said before.

In a preferred embodiment of the invention the pieces are fed one by one on said longitudinal deck whose surface does advantageously have a plurality of pointed protrusions. Said hammering is as well preferentially carried out in an individual way on each piece.

The characteristics of the invention and in particular those of the machine to implement the described method will become more apparent when reading the following detailed description of an example of an embodiment shown in the enclosed drawings.

DETAILED DESCRIPTION OF A PREFERRED EMBODIMENT

Figure 2:
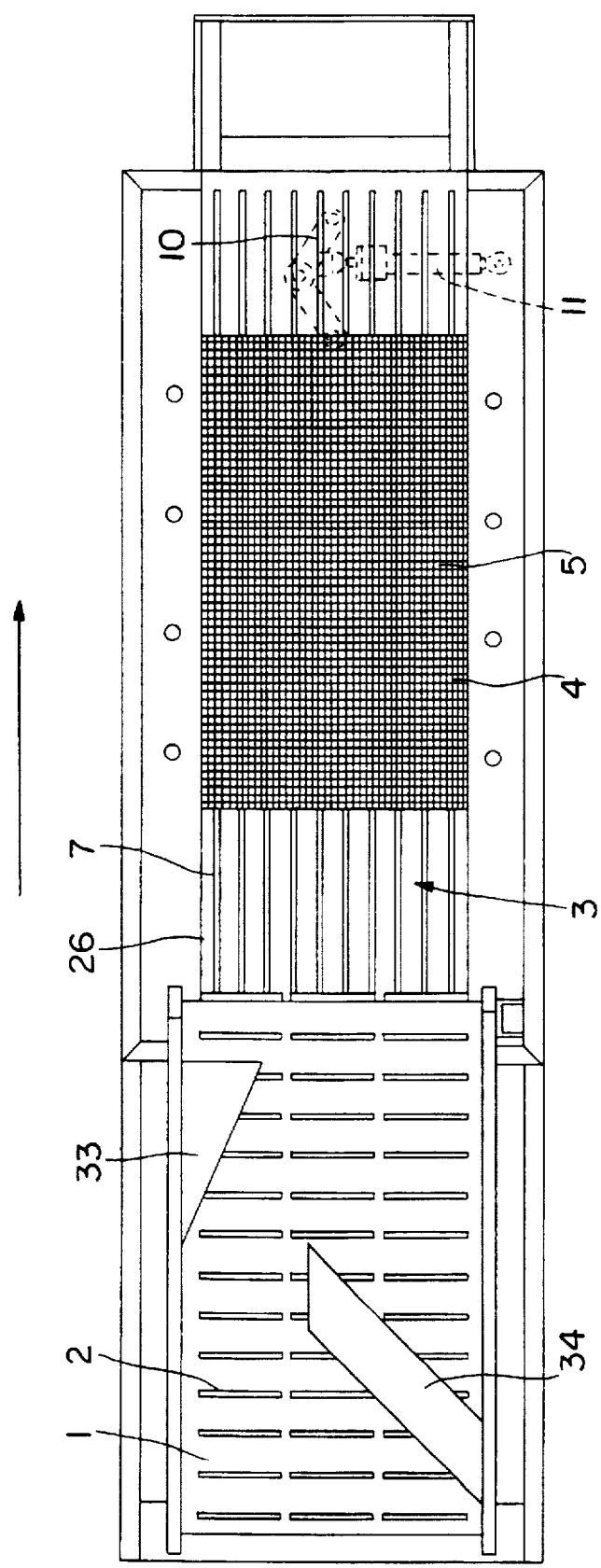
FIG. 2 shows in plan-view the conveyor for feeding the meat pieces one by one and the longitudinal deck on which the meat pieces to be treated advance.
Figure 3:
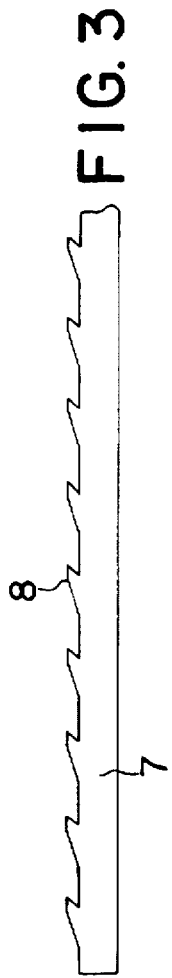
FIGS. 3 and 4 show in a side elevation and in a plan-view respectively the configuration of a length of one of the sliding bars with a toothed profile for the intermittent conveyance of the meat pieces.
Figure 4:
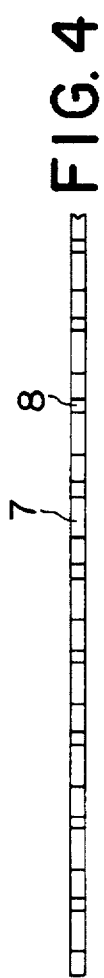

According to these figures the machine for the treatment of meat pieces comprises a conveyor 1 with flights 2 dividing it into sectors and which with the aid of inclined plates 33 and 34 provide a unitary feeding of meat pieces towards a stationary, longitudinal deck 3 having a plurality of pointed protrusions 4 which are for example tetrahedral or in general pyramidal (see FIGS. 2 and 5) and are in general evenly distributed along the surface of said deck 3. In the exemplified embodiment said deck 3 is formed by an array of oblong, longitudinal plates 5 by way of strips mounted side to side on a bearing base 6 and fastened to it with their lower surface by means of fastening screws, the exposed surface of said longitudinal plates 5 providing said pointed protrusions 4 of stationary deck 3. Between said plates 5 with protrusions 4 are defined rectilinear sites 26 in which are arranged, in a sliding assembly, longitudinal bars 7 having an upper profile with an inclined sawtooth shape 8 with the points of said sawteeth 8 oriented in feeding direction, said upper profile slightly protruding above said protrusions 4 of the stationary deck 3, said bars being attached at one of their ends to an inverted U-shaped profile member 9 by way of a cross member, said profile member 9 connecting the bars with each other being linked through a sliding member 37 to a leverage 10 to which is linked to the rod of a double-action, fluid-operated actuating cylinder 11 situated below and in the vicinity of the outfeed end of deck 3 and operable to shift said toothed bars 7 in a back-and-forth motion. Under the deck 3 a receiving tray 38 has been provided.

Figure 1:
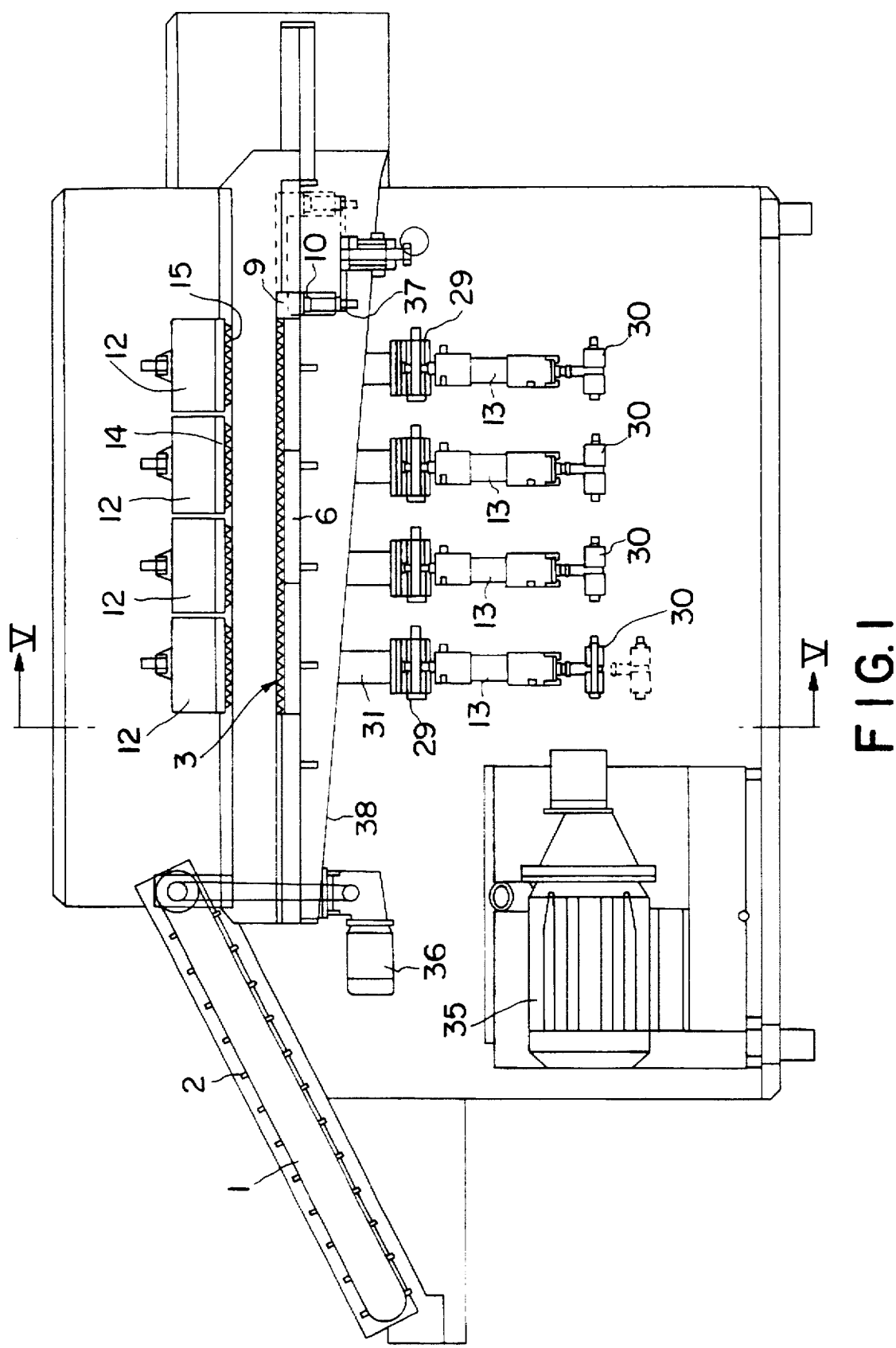
FIG. 1 is an elevational view of the whole proposed machine detailing its main component members.

There is above said deck 3 an aligned array of independent hammering members 12 associated to respective hydraulic cylinders 13 (one for each hammering member 12, as shown in FIG. 1) for purposes of their unitary actuation, each of said cylinders being operable to move downwards the respective one of said members 12 till the latter hits by way of a hammer the meat piece at a stage at which the latter has stopped in its travel on said deck 3, and to return after said blow the corresponding hammering member 12 to an inactive position above said deck 3.

For replacement purposes removably fastened to its lower surface provided to strikingly contact the meat pieces each hammering member 12 includes a plate 14 provided with a plurality of pointed protrusions 15 whose distribution and number are individually chosen for each of the plates (see FIG. 6) for the purpose of singularizing their actuation.

Figure 5:
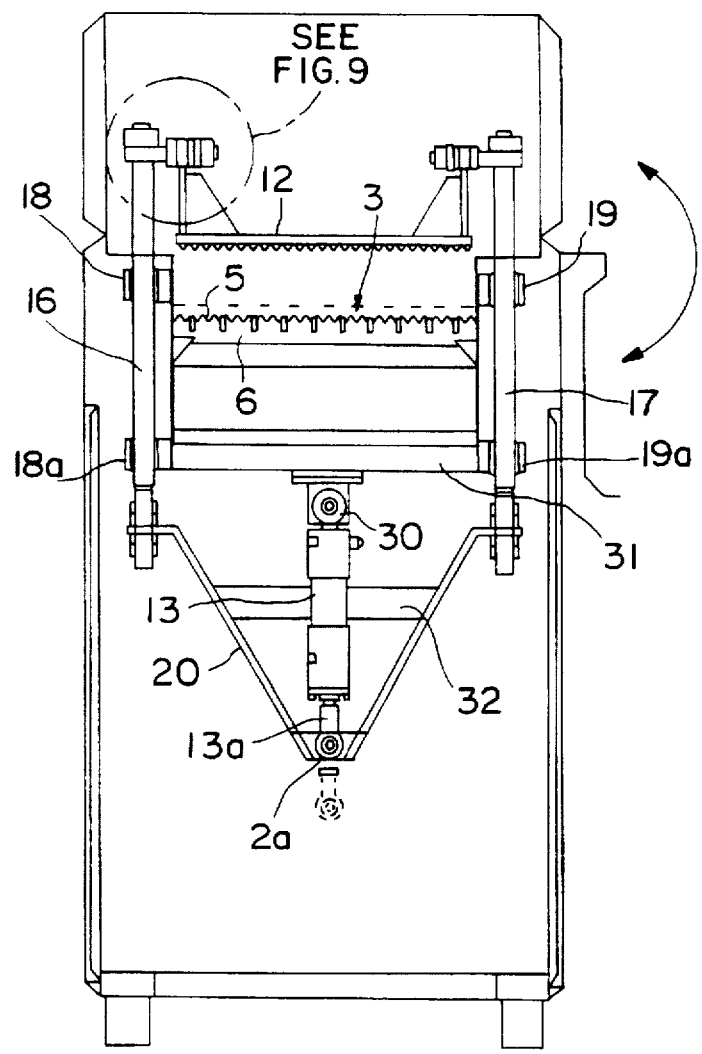
FIG. 5 is a cross-sectional view of said machine along section line V—V in FIG. 1.
Figure 9:
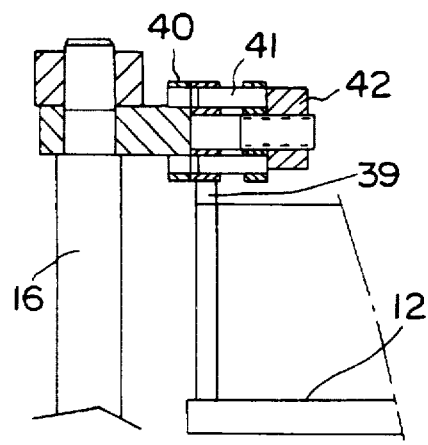
FIG. 9 shows an enlarged detail of the means provided to raise said hammering blocks.

As can be seen in FIG. 5, each of said hammering members 12 is connected at two distal ends to an upper portion of each of two upright bars 16, 17 properly guided in bushes 18, 18a, 19, 19a attached to the arms of U-shaped members 31 which are solid with the upper portion of the machine frame, said bars 16, 17 being operable to move upwards and downwards because of having their lower ends mutually connected by a V-shaped bridge member 20 with a reinforcing tiebar 32, said bridge member being linked to rod 13a of a fluid-operated cylinder 13 of vertical travel which is mounted in a hinged connection and suspended from the central portion of said U-shaped member 31.

In order to cushion the effects of each blow bushings 29, 30 of resilient material have been arranged around the hinge pins of the hinged connections of said cylinder 13 to said central portion of the U-shaped member 31 and to the vertex of the V-shaped member 20.

It has been foreseen to adjust or graduate the strength of each of the hammering members 12, and to select by means of a control unit known in itself and in a programed way the number of hammering members 12 to be active in each case and the number of blows to be dealt by each of them to a meat piece on the basis of the particular characteristics of the latter.

The motor of a hydraulic pump for the supply of pressurized fluid to the different above-mentioned cylinders has been indicated with numeral 35. And electrical motorreducer for driving said conveyor 1 has been indicated with numeral 36.

Figure 6:
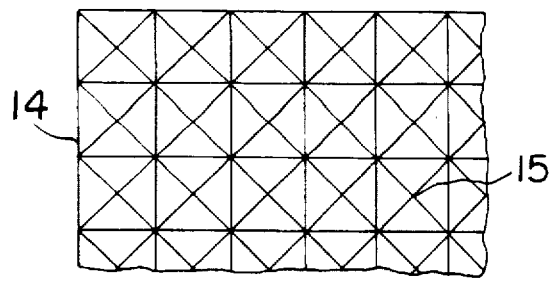
FIG. 6 is a partial detail, on an enlarged scale, of the structure with multiple pointed protrusions of one of the plates that are removably associated to one of the hammering members.
Figure 7:
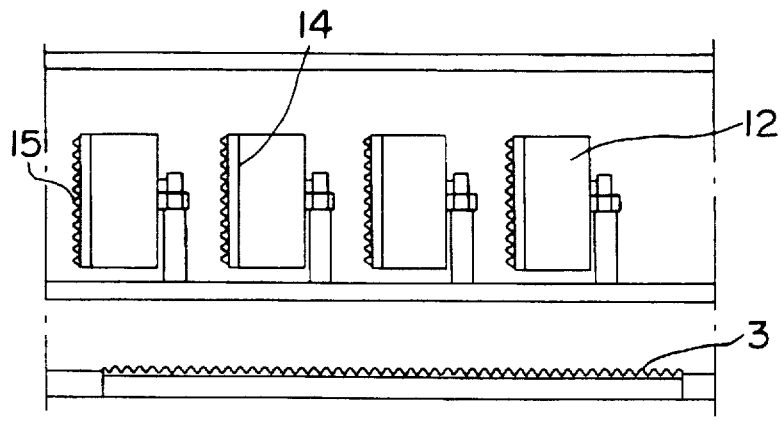
FIGS. 7 and 8 show the hammering blocks raised in a first position for cleaning, and in a second position, oriented upwards, for canceling their actuation in case of their being actuated by an actuating cylinder.
Figure 8:
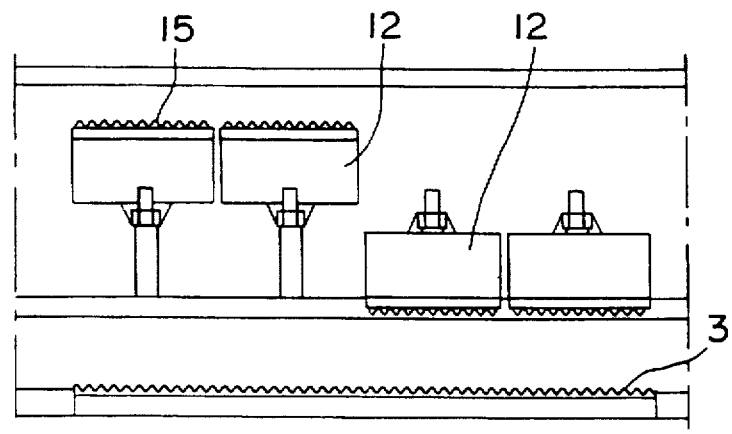

In order to set apart, in sequence, the hammering blocks 12 as per the FIGS. 6 and 7, said blocks have been provided with two arms 39 attached by one end to a rotatable bushes 40 which can be blocked by locking pins 41 longitudinally shiftable by a nut 42.

Thanks to everything explained above, with the described method and machine different hammerings can be progressively produced on each meat piece at each stopping stage till said piece reaches the outfeed end of deck 3 to be transferred to the subsequent operation, thereby causing in said meat piece a tendering and weakening of the intermuscular connections in the case of the unboned products, or a quick stretching of the muscular fibers in case of injected pieces thereby leaving free intramuscular spaces and thus facilitating the encroachment of ingredients and additives and hence allowing to shorten the ulterior processes of maceration or of another type, as has been indicated.

I claim:

1. A method for the treatment of meat pieces by hammering, in particular of boned or unboned meat pieces, comprising the following steps:

feeding meat pieces on a longitudinal deck;

moving in advance said meat pieces along said longitudinal deck with stopping stages of its travel on said deck;

submitting each meat piece in said stopping stages, to the action of a respective hammering member of a set arranged in an aligned array above said deck, said hammering members being independent and different among them; and adjusting the strength with which each of said independent hammering members is to actuate; and selecting the number of said independent hammering members intervening during a treatment and the number of blows to be dealt by each of said hammering members depending on the characteristics of said meat pieces to be treated;

thereby bringing about a tendering of said meat pieces, an accelerated stretching of their muscular fibers, increasing intramuscular spaces and producing a weakening of intramuscular connections thereof.

2. Method as per claim 1, wherein a surface of said longitudinal deck includes a plurality of first pointed protrusions and a face of said hammering members provided to contact the meat piece also has a plurality of second pointed protrusions.

3. Method as per claim 1, wherein said unboned meat pieces are previously injected with brine or another additive, fat, binder or a similar product.

4. Machine for the treatment of meat pieces by hammering, comprising:

a conveyor providing a unitary feeding of meat pieces towards a stationary, longitudinal deck;

a plurality of first pointed protrusions distributed along the surface of said deck;

means to advance said meat pieces with stopping stages, associated to said longitudinal deck, and protruding thereof through slits;

above said deck a plurality of independent aligned hammering member associated to respective individual actuators being operable to move downwards the respective one of said members till hitting at least one of said meat pieces while being at said stopping stages and to return after said hitting, a corresponding hammering member to an inactive position above said deck;

means to adjust the strength of each of said independent hammering members;

means to select the number of hammering members to be active; and a plurality of second pointed protrusions on the face of said hammering members provided to contact said meat pieces.

5. Machine, as per claim 4, wherein:

said deck is formed by an array of oblong, longitudinal plates by way of strips mounted side to side on a bearing base and fastened to it with their lower surface by means of fastening elements, the upper exposed surface of said longitudinal plates providing said first pointed protrusions of said stationary deck;

between said plates with said first pointed protrusions there are rectilinear slits in which are arranged, in a sliding assembly, longitudinal toothed bars having an upper profile with an inclined sawtooth shape with the points of said sawteeth oriented in said advance direction;

said upper profile slightly protruding above said protrusions of said stationary deck;

said bars being attached at one of their ends to an inverted U-shaped profile member by way of a cross member and said profile member being linked through a sliding member to a leverage to which is linked a rod of a fluid-operated actuating cylinder operable to shift said toothed bars in a back-and-forth motion.

6. Machine as per claim 4, wherein removably fastened to a lower surface provided to strikingly contact said meat pieces each of said hammering members includes a removable plate provided with a plurality of second pointed protrusions showed distribution shape and number are individually chosen for each of the plates.

7. Machine as per claim 4, wherein:

each of said hammering members 12 is connected at two distal ends to an upper portion of each of two upright bars properly guided in bushes attached to corresponding side branches of U-shaped members which are solid with an upper portion of the machine frame;

said upright bars being operable to move upwards and downwards because of having their lower ends mutually connected by a V-shaped bridge member with a reinforcing tiebar;

said bridge member being linked to a rod of a fluid-operated cylinder of vertical travel which is mounted in a hinged connection and suspended from a central portion of said U-shaped member.

8. Machine, as per claim 7, wherein in order to cushion the effects of each blow, bushings of resilient material have been arranged around hinge pins of hinged connections of said cylinder to said central portion of said U-shaped member and to a vertex of said V-shaped member.

9. Machine, as per claim 4, wherein in order to set apart, in sequence, said hammering members, they have been provided with two arms attached by one end to a rotatable bushing which can be blocked by locking pins longitudinally shiftable by a nut.

10. A method for the treatment of meat pieces by hammering, in particular of boned or unboned meat pieces, comprising the following steps:

feeding meat pieces on a longitudinal deck, and said unboned meat pieces being previously injected with brine or another additive, fat, binder or a similar product, moving in advance said meat pieces along said longitudinal deck with stopping stages; during said stopping stages, submitting said meat pieces to one or more blows dealt by a succession of hammering members; and adjusting the strength with which each of said hammering members is to actuate, and selecting the number of said hammering members intervening during a treatment and the number of blows to be dealt by each of said hammering members dependent on the characteristics of said meat pieces to be treated;

thereby bringing about a tendering of said meat pieces, an accelerated stretching of their muscular fibers increasing intramuscular spaces and producing a weakening of intramuscular connections thereof.

11. Machine for the treatment of meat pieces by hammering, comprising:

a conveyor providing a unitary feeding of meat pieces towards a stationary, longitudinal deck;

a plurality of first pointed protrusions distributed along the surface of said deck, said deck including an array of oblong, longitudinal plates by way of strips mounted side to side on a bearing base and fastened to the bearing base with their lower surface by means of fastening elements, the upper exposed surface of said longitudinal plates providing said first pointed protrusions of said stationary deck; and between said plates with said first pointed protrusions there are rectilinear slits in which are arranged, in a sliding assembly, longitudinal toothed bars having an upper profile with an inclined sawtooth shape with the points of said sawteeth oriented in said advance direction;

said upper profile slightly protruding above said protrusions of said stationary deck;

said bars being attached at one of their ends to an inverted U-shaped profile member by way of a cross member and said profile member being linked through a sliding member to a leverage to which is linked a rod of a fluid-operated actuating cylinder operable to shift said toothed bars in a back-and-forth motion;

means to advance said meat pieces with stopping stages, associated to said longitudinal deck;

above said deck a plurality of independent aligned hammering member associated to respective individual actuators being operable to move downwards the respective one of said members till hitting at least one of said meat pieces while being at said stopping stages and to return after said hitting, a corresponding hammering member to an inactive position above said deck; and a plurality of second pointed protrusions on the face of said hammering members provided to contact said meat pieces.

12. Machine for the treatment of meat pieces by hammering, comprising:

a conveyor providing a unitary feeding of meat pieces towards a stationary, longitudinal deck;

a plurality of first pointed protrusions distributed along the surface of said deck;

means to advance said meat pieces with stopping stages, associated to said longitudinal deck;

above said deck a plurality of independent aligned hammering member associated to respective individual actuators being operable to move downwards the respective one of said members till hitting at least one of said meat pieces while being at said stopping stages and to return after said hitting, a corresponding hammering member to an inactive position above said deck, each of said hammering members being connected at two distal ends to an upper portion of each of two upright bars properly guided in bushes attached to corresponding side branches of U-shaped members which are solid with an upper portion of the machine frame;

said upright bars being operable to move upwards and downwards because of having their lower ends mutually connected by a V-shaped bridge member with a reinforcing tiebar;

said bridge member being linked to a rod of a fluid-operated cylinder of vertical travel which is mounted in a hinged connection and suspended from a central portion of said U-shaped member; and a plurality of second pointed protrusions on the face of said hammering members provided to contact said meat pieces.

13. Machine, as per the claim 12, wherein in order to cushion the effects of each blow, bushings of resilient material have been arranged around hinge pins of hinged connections of said cylinder to said central portion of said U-shaped member and to a vertex of said V-shaped member.

14. Machine for the treatment of meat pieces by hammering, comprising:

a conveyor providing a unitary feeding of meat pieces towards a stationary, longitudinal deck;

a plurality of first pointed protrusions distributed along the surface of said deck;

means to advance said meat pieces with stopping stages, associated to said longitudinal deck;

above said deck a plurality of independent aligned hammering member associated to respective individual actuators being operable to move downwards the respective one of said members till hitting at least one of said meat pieces while being at said stopping stages and to return after said hitting, a corresponding hammering member to an inactive position above said deck in order to set apart, in sequence, said hammering members, said hammering members being provided with two arms attached by one end to a rotatable bushing which can be blocked by locking pins longitudinally shiftable by a nut; and a plurality of second pointed protrusions on the face of said hammering members provided to contact said meat pieces.

* * * * *